(12) United States Patent
Fusaro, Jr. et al.

(10) Patent No.: US 6,506,995 B1
(45) Date of Patent: Jan. 14, 2003

(54) CONFORMING WELDING TORCH SHROUD

(75) Inventors: Robert Anthony Fusaro, Jr., Cobleskill, NY (US); Harvey Donald Solomon, Schenectady, NY (US); Karen Kettler Denike, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 6 days.

(21) Appl. No.: 09/681,892

(22) Filed: Jun. 21, 2001

(51) Int. Cl.⁷ ............................................. B23K 9/00
(52) U.S. Cl. ............... 219/72; 219/121.45; 219/121.47
(58) Field of Search .................. 219/72, 74, 121.45, 219/121.47, 137.42

(56) References Cited

U.S. PATENT DOCUMENTS

| | | | | |
|---|---|---|---|---|
| 1,552,369 A | * | 9/1925 | White | 219/74 |
| 4,035,602 A | * | 7/1977 | Berghof | 219/72 |
| 4,039,798 A | * | 8/1977 | Lythall et al. | 219/72 |
| 4,654,500 A | * | 3/1987 | Stiles et al. | 219/72 |
| 5,690,844 A |   | 11/1997 | White et al. | 219/121.47 |
| 5,780,804 A | * | 7/1998 | White et al. | 219/121.46 |
| 5,852,271 A | * | 12/1998 | Offer | 219/72 |
| 6,084,197 A |   | 7/2000 | Fusaro, Jr. | 219/121.47 |

OTHER PUBLICATIONS

Bloch New England, "Jet Drying Super Block", 1995, product packaging.
Richardson, "Underwater Arc Welding", Welding Review, Feb. 1989, five pages.
Nixon, "Current Trends on Hyperbaric Welding Researchj", Welding and Metal Fabrications, May 1991, p. 101–117.
Masubuchi, "Recent Topics in Underwater Welding", Proceedings of EVALMAT 89, 1989, pp. 771–785.
"Development of Underwater Welding", by J.H. Nixon, Welding & Metal Fabrication, May 1991, pp. 174–177.

* cited by examiner

Primary Examiner—M. Alexandra Elve
Assistant Examiner—Kevin P. Kerns
(74) Attorney, Agent, or Firm—Noreen C. Johnson; Philip D. Freedman

(57) ABSTRACT

A shroud for a welding torch includes a hydrophilic skirt supported by a frame. The skirt is soft and pliable when wet and is self protected from the heat of welding by the water absorbed therein. The frame supports the skirt around the weld site and permits a good seal with the workpiece for excluding water during the welding process.

29 Claims, 4 Drawing Sheets

CONFORMING WELDING TORCH SHROUD

BACKGROUND OF INVENTION

The present invention relates generally to underwater welding, and, more specifically, to welding or cladding under water using a metal filler material.

In underwater welding it is desirable to locally exclude or prevent water contact with the molten metal pool as it is formed and as it hardens for enhancing the strength thereof. Welding inherently effects a heat affected zone at the weld site in which the material properties of the metal may change from those of the unwelded parent material. Water quenching of the weld further affects the material properties in the weld region.

Maintaining material properties and corresponding strength for underwater metal components is particularly important in a Boiling Water Reactor (BWR) which is typically designed for long service life. Various components in a BWR require welding during assembly or during normal repair. Such welding typically includes the addition of a filler material in the form of a powder or wire typically used in repair or cladding of the components.

There are various forms of welding torches that may be used underwater for locally welding metal components. In one welding technique being developed, Underwater Plasma Transferred Arc (UPTA) is used for locally melting a metal component for repair or cladding. In plasma arc welding, an electrical arc is formed in the presence of an ionizing gas to form a hot plasma which is used to melt the surface of the workpiece, and upon which a filler material is clad.

A typical plasma torch includes a center electrode in a housing which defines a second electrode between which the arc is formed. The ionizing gas is channeled through the torch and out a central nozzle orifice surrounding the tip of the center electrode for forming the plasma.

In a plasma transferred arc torch, the workpiece itself defines a second electrode, or ground, instead of the torch housing, and the arc is formed between the electrode and the workpiece. In either embodiment, the plasma generates sufficient heat for locally melting the workpiece and filler material for cladding the workpiece.

The cladding process may be effected underwater by temporarily excluding or removing water from the immediate vicinity of the plasma arc so that the filler material may be melted atop the developed melt pool which is quench cooled as the torch is carried along a welding path.

The water is temporarily excluded from the vicinity of the plasma torch by introducing a pressurized shielding gas inside a surrounding shroud or skirt for displacing the water therefrom. The pressure of the shielding gas must be suitably higher than the hydrostatic pressure of the water at the particular depth for expelling the water from the shroud surrounding the torch nozzle.

The shroud is attached to the welding torch and is suitably larger than the local melt pool for excluding water therefrom and preventing immediate quenching of the pool until the torch is moved along its welding path. The shroud may be formed of a suitable metal to protect it from the hot temperature of the plasma arc formed during operation.

In order to effectively exclude the water from inside the shroud, the shroud must closely engage the surface of the workpiece for maintaining pressurization of the shielding gas inside the shroud and prevent water entry therein. However, the metal shroud is rigid and cannot conform to variations in the surface of the workpiece which create large gaps with the shroud through which the shielding gas can leak.

Accordingly, a metal wool ring may be used at the distal end of the shroud to improve conformance of its junction with the workpiece and minimize gas leakage therethrough. The ring has some flexibility for accommodating some variation in surface uniformity, but is too stiff for sealing typical weld beads formed in layers atop the workpiece, or to seal a narrow trench being filled with metal.

In some repair operations, defects or cracks may be removed by grinding the parent metal leaving a small trench in the surface thereof. Underwater welding must then be used to fill the trench with metal, yet this must be done by locally excluding the water at the weld site.

Accordingly, it is desired to provide an improved welding torch shroud for excluding water during underwater welding while conforming with the workpiece around the weld site.

SUMMARY OF INVENTION

A shroud for a welding torch includes a hydrophilic skirt supported by a frame. The skirt is soft and pliable when wet and is self protected from the heat of welding by the water absorbed therein. The frame supports the skirt around the weld site and permits a good seal with the workpiece for excluding water during the welding process.

BRIEF DESCRIPTION OF DRAWINGS

The invention, in accordance with preferred and exemplary embodiments, together with further objects and advantages thereof, is more particularly described in the following detailed description taken in conjunction with the accompanying drawings in which.

DETAILED DESCRIPTION

Figure 1:
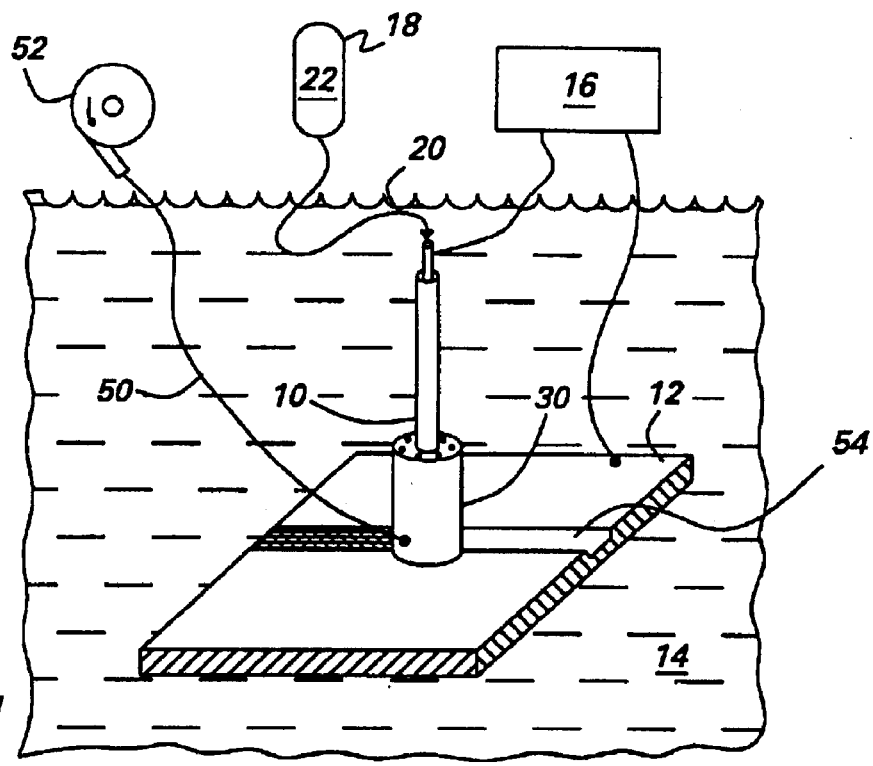
FIG. 1 is a schematic, elevational view of an underwater welding torch for welding or cladding a workpiece at depth underwater in accordance with an exemplary embodiment of the present invention.

Illustrated schematically in FIG. 1 is an underwater welding torch 10 configured for welding a metallic workpiece 12 at a suitable depth under water 14. The workpiece may be any of various internal components in a BWR nuclear reactor for which welding repair or cladding thereof is desired, although the invention may be used for other welding applications as desired.

The welding torch may have any conventional configuration for effecting underwater welding, including, for example, gas tungsten arc welding, gas metal arc welding, and shielded metal arc welding.

In the exemplary embodiment illustrated in FIG. 1, the welding torch is configured for Underwater Plasma Transferred Arc (UPTA) welding. The welding torch 10 is therefore disposed in a system including an electrical power supply 16 having one electrical lead joined to the torch, and a second electrical lead joined to the workpiece for providing an electrical ground.

Suitable means in the form of a gas supply 18 are joined in flow communication with the torch using a flexible conduit 20 for supplying a pressurized inert gas 22, such as Argon, for use in developing the plasma and providing a suitable shielding gas therearound.

Figure 2:
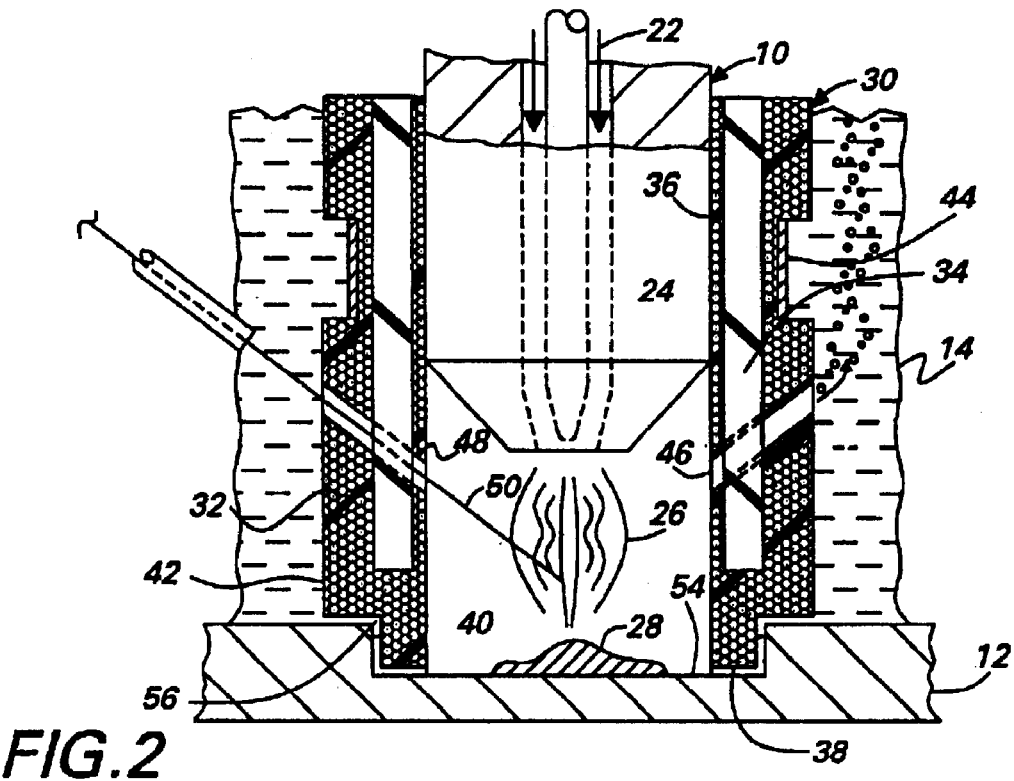
FIG. 2 is a partly sectional, enlarged view of the shroud surrounding the welding torch illustrated in FIG. 1.

Illustrated in FIG. 2 is the lower or distal end of the welding torch 10 which defines a welding nozzle 24. As indicated above, the welding torch may have any conventional configuration for generating sufficient welding heat to locally melt the workpiece for welding thereof. The plasma torch configuration thereof includes an electrically insulated center electrode within the nozzle around which the inert gas 22 is channeled during welding.

During plasma welding, the ionizing gas 22 is channeled through the torch and out the nozzle for forming a hot plasma 26. The plasma arc is formed between the nozzle and the workpiece which are suitably joined to the power supply 16 as illustrated in FIG. 1. The plasma is effective for locally melting the workpiece 12 to provide a molten melt pool 28 for the welding process.

However, in order to exclude the water 14 from the local welding site, the welding torch further includes a shroud 30 suitably mounted to the distal end thereof in which shroud the plasma 26 may be contained in isolation from the surrounding water. The same gas 22 used for the developing the plasma 26 may also be used to exclude water from inside the shroud by being contained therein under pressure suitably larger than the hydrostatic pressure of the surrounding water.

The welding torch shroud 30 illustrated in FIG. 2 includes a hydrophilic skirt 32 preferably supported by an internal frame 34. The skirt is annular or tubular, with a tubular socket 36 at the proximal end thereof for receiving the nozzle end of the torch, and a flexible annular cuff 38 at the opposite distal end thereof for conforming to the surface of the workpiece being welding.

In the preferred embodiment illustrated in FIG. 2, the skirt 32 is in the form of a sponge being highly absorbent of the water. In this way, when used under water the sponge absorbs some of the surrounding water and effectively defines a water skirt with sufficient structural integrity to isolate the welding site directly below the welding nozzle 24.

The sponge skirt illustrated in FIG. 2 includes a radially inwardly facing inner surface 40, and an opposite radially outwardly facing outer surface 42 both exposed directly to the surrounding environment without obstruction. In this way, when the torch and shroud are initially submerged in the water, water may be readily absorbed into the sponge skirt from both sides. The sponge cuff 38 may then be placed in contact with the workpiece to locally enclose the welding site.

The ionizing or shielding gas 22 may then be discharged through the nozzle and into the enclosure defined by the shroud under suitable pressure for displacing and removing water from the welding site. The skirt is sufficiently porous for absorbing surrounding water, yet is sufficiently impervious to loss of the pressurized gas therethrough. In this way, the pressurized gas maintains a gas bubble within the volume of the shroud in which welding may occur without water interaction, yet the water filled skirt is self-protected by the water against the high temperature of the plasma 26 formed therein.

A particular advantage of the sponge skirt 32 is its hydrophilic ability to readily absorb and retain the surrounding water to effectively provide a water curtain around the weld site. The skirt may be formed of any suitable water permeable material and is typically flimsy or weak when wet as opposed to its condition when dry. This flimsy or flexible condition of the skirt enhances the ability of the cuff 38 to conform to any irregularities in the surface of the workpiece at the weld site.

However, the skirt 32 is preferably supported by the frame 34, specifically when wet, to maintain its original structural configuration such as the annular form illustrated in FIG. 2. Alternatively, the frame may be omitted provided the skirt is otherwise protected from undesirable collapse by controlling compression loads on the skirt.

Figure 3:
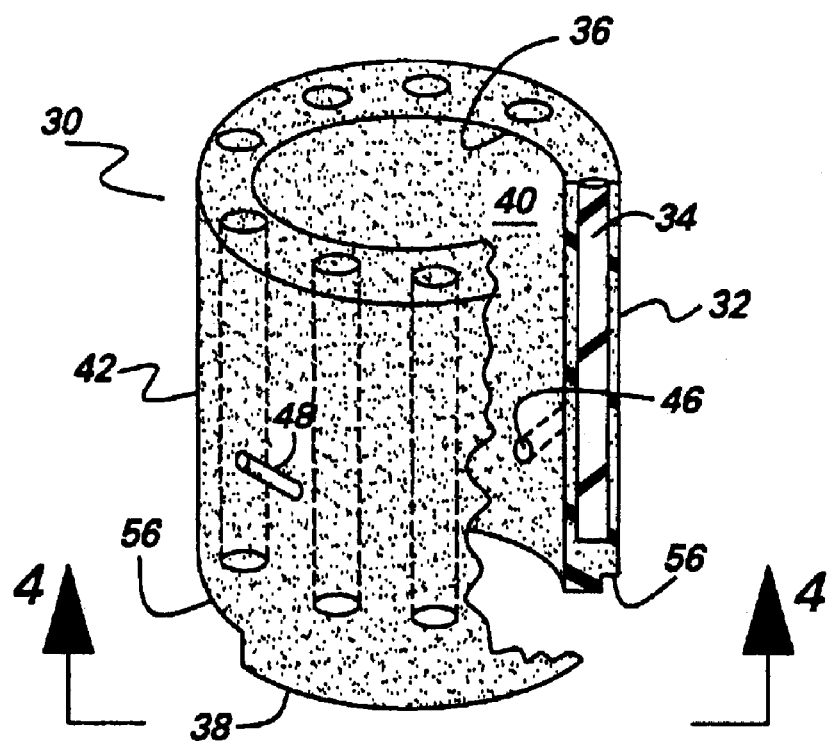
FIG. 3 is a partly sectional, isometric view of the welding torch shroud illustrated in FIG. 2 in isolation from the welding torch.

As illustrated in FIGS. 2 and 3, the frame 34 preferably comprises a plurality of circumferentially spaced apart stiffening plugs or rods extending axially inside the skirt 32 between the inner and outer surfaces 40, 42 thereof from the socket 36 toward the cuff 38.

The rod frame 34 may be formed of any suitable material, such as flexible silicone, which is nevertheless rigid along the length axis thereof. The rods preferably extend from the socket end of the skirt downwardly through the tubular wall thereof and terminate inside the skirt short of or spaced from the distal end of the cuff 38.

In this way, the entire cuff 38 remains flexible sponge without rigidity for conforming to irregularities in the workpiece for maintaining an effective contact seal therewith during operation. As shown in FIG. 2, the cuff 38 engages or contacts the surface of the workpiece 12 for providing a contact seal therewith for preventing ingress of water thereat while maintaining pressurization of the gas inside the shroud with slight outward leakage of the gas at the cuff-workpiece interface.

The socket 36 of the skirt illustrated in FIG. 2 is preferably sized in diameter to closely fit the perimeter of the welding torch at the nozzle 24 in a snug fit, and a conventional hose clamp 44 may surround the socket end of the skirt for clamping it tightly against the welding nozzle. Since the sponge skirt is flexible, the internal rod frame 34 adds strength to the skirt and ensures a strong mounting support to the welding nozzle.

The rods extend downwardly from the welding nozzle and prevent vertical collapse of the skirt as the welding torch is held in position against the surface of the workpiece. The cuff 38 locally collapses or compresses to form a conforming seal with the workpiece, with the internal rod frame preventing further vertical collapse of the pliant skirt during the welding process.

Since the water filled skirt is effectively impermeable to the pressurized gas discharged from the nozzle, the shroud preferably also includes a vent 46 in the form of a metal tube extending through the wall of the skirt between its inner and outer surfaces. In this way, the pressurized gas and developed plasma may be vented through the skirt during operation to minimize or reduce any leakage thereof at the seal between the cuff and workpiece. Venting through the metal vent tube will prevent local drying of the sponge skirt which could otherwise be damaged by the hot plasma during operation.

The sponge skirt is protected from the welding temperatures by the constant supply of surrounding water through the sponge. As water is heated and evaporated along the inner surface of the sponge skirt during operation, it is constantly replenished by absorption through the outer surface of the skirt.

Common sponges when dry are relatively rigid and easily damaged by excessive temperature. However, when wet, a sponge is self-protected from heat by the water contained therein. Similarly, the preferred sponge skirt 34 is substantially rigid when dry, but is quite soft and resilient when wet.

A particular advantage of the rigidity of the sponge when dry is its ability to be readily cut or machined to the desired shape for use in the welding shroud. When dry, corresponding apertures may be formed for receiving the silicone rods 34 and the vent tube 46. The silicone rods may be formed using initially liquid silicone poured into drilled holes in the sponge skirt, with the silicone curing at room temperature in a common manner. The vent tube may be inserted through a hole formed through the skirt wall and suitably bonded therein, using silicone for example.

In a preferred embodiment, the sponge skirt 32 may be formed from a common car washing sponge, such as the JET DRYING SUPERBLOCK sponge sold under the TURTLE WAX brand, and commercially available from Bloch New England, Worcester, Mass. This sponge has the consistency of balsa wood when dry and is readily machinable into desired shapes for use as the welding skirt, but is highly water absorbent and extremely pliant and flexible when wet. When used for the welding torch shroud disclosed above, this sponge is highly conforming to irregularities in the workpiece surface, yet is self-protected by the water absorbed therein from the high heat produced during welding.

Since the welding process typically requires the addition of welding material, the shroud illustrated in FIG. 2 preferably also includes a feed port 48 extending through the wall of the skirt for receiving a welding filler wire 50 therethrough during operation. As shown in FIG. 1, a wire feeder 52 of any conventional design may be used to feed the filler wire 50 through the water and through the shroud into the hot plasma for filling the melt pool during welding. The access port 48 may be a simple aperture through the sponge skirt, or may be a metal tube bonded therein for receiving the filler wire.

Figure 4:
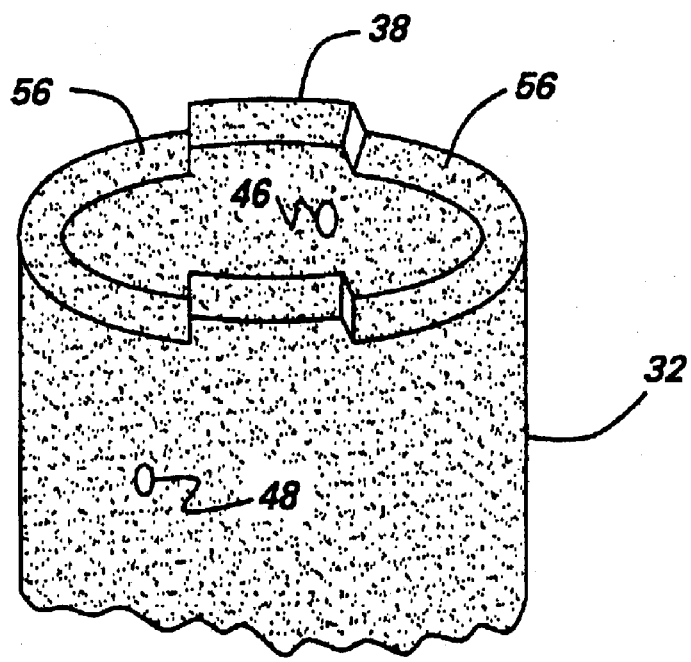
FIG. 4 is a isometric view of the bottom end of the shroud illustrated in FIG. 3 and taken generally along line 4—4.

As illustrated in FIGS. 2 and 4, the cuff 38 defined at the distal end of the skirt may have any suitable shape and is preferably annular, with a flat or contoured distal end face for sealingly engaging the corresponding surface of the workpiece 12. Since the sponge cuff 38 is highly flexible when wet, the specific configuration thereof may vary while still maintaining an effective contact seal with the workpiece.

However, in the exemplary workpiece illustrated in FIGS. 1 and 2, a narrow trench 54 may be formed therein, by grinding for example, for removing defects or cracks therein. Welding is then used to refill the trench with the filler wire 50. If the shroud were formed of metal or other substantially rigid material, a substantial gap would be formed when positioning the shroud over the trench which would effectively prevent exclusion of water at the weld site.

However, the sponge skirt 32 may be configured with a pair of diametrically opposite steps 56 as illustrated in FIGS. 2 and 4 so that a portion of the cuff 38 may fit within the trench 54, with the steps 56 being disposed atop the adjacent surface of the workpiece. In this way, a better conforming seal between the cuff and the workpiece may be obtained for reducing or preventing water leakage into the shroud during operation.

Since welding typically occurs in multiple passes which build layers of welding beads, the pliant cuff 38 may locally conform to each weld bead as it is formed for maintaining an effective seal thereat during the welding process. The welding torch and attached shroud are suitably moved during the welding process as the weld bead is formed. The pliant cuff 38 conforms with the original workpiece surface prior to welding and also conforms with the weld bead formed during the process.

In the exemplary embodiment illustrated in FIGS. 1–4, the sponge skirt 32 is preferably tubular, with the socket 36 and cuff 38 being coaxially aligned at opposite ends thereof. In this way, the shroud at its socket end may be clamped around the welding torch nozzle 24, with the cuff end of the shroud extending downwardly therefrom to engage the workpiece and form a suitable seal thereat. The stepped cuff 38 illustrated in FIGS. 2–4 may be used to improve sealing conformance with the welding trench 54 if desired.

Figure 5:
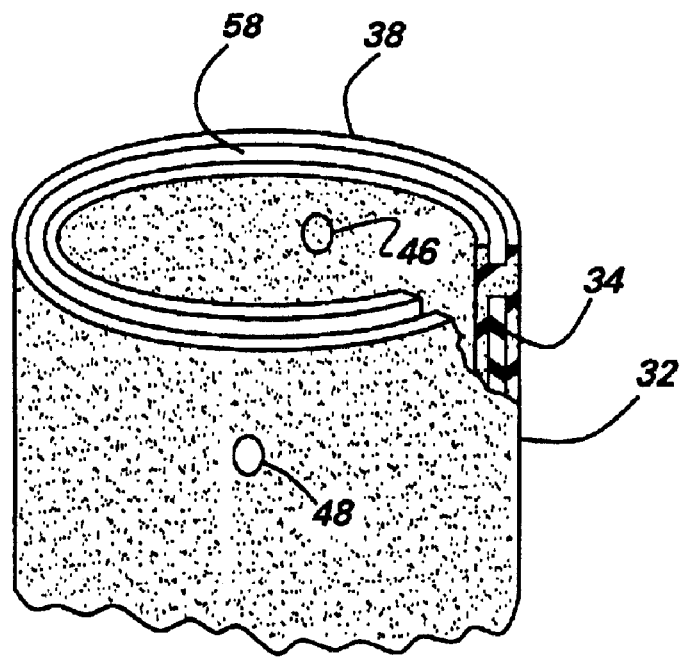
FIG. 5 is an isometric view, like FIG. 4, of the bottom end of the shroud in accordance with another embodiment of the present invention.

FIG. 5 illustrates an alternate embodiment of the sponge skirt 32 in which the cuff 38 is also annular around the circumference of the skirt, but defines a common axial plane having a concentric recess or slot 58 in the flat distal face thereof. The slot 58 introduces additional flexibility in the cuff 38 for better conforming with irregularities in the workpiece surface such as relatively high weld beads as they are formed.

Depending upon the amount of flexibility or stiffness of the wet skirt itself, various features such as the steps 56 in FIG. 4 or the slot 58 in FIG. 5 may be introduced into the cuff for providing additional flexibility thereof for conforming with expected irregularities in the workpiece surface.

The sponge skirt illustrated in FIGS. 1–5 is one example of hydrophilic material having strong affinity to water which is readily absorbed therein and retained. In this way, an effective water curtain surrounds the welding site for containing the pressurized gas and hot plasma therein while effectively excluding the surrounding water. And, the sponge skirt when wet introduces significant flexibility for ensuring a conforming seal with the workpiece. Other forms of hydrophilic shrouds may also be used.

Figure 6:
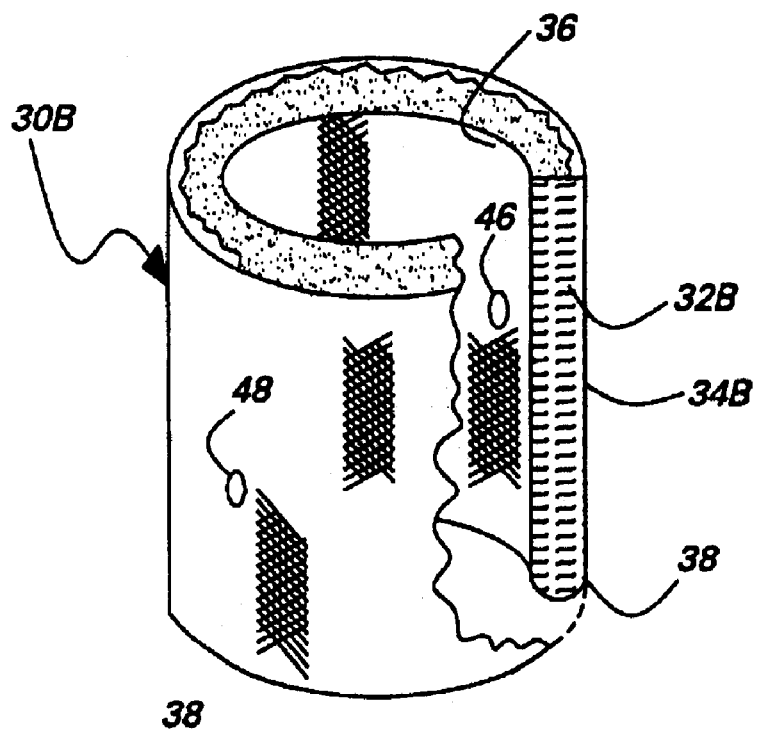
FIG. 6 is a partly sectional isometric view of a welding torch shroud in accordance with another embodiment of the present invention.

For example, FIG. 6 illustrates an alternate embodiment of the shroud designated 30B in which the skirt 32B is in the form of a hydrophilic water absorbing fiber bundle of those types typically found in baby diapers. For example, the fiber material from the LUVS brand of baby diapers, commercially available from Proctor & Gamble, Cincinnati, Ohio, may be used for its strong affinity for water retention.

However, the fiber bundle has little if any structural form or integrity like the sponge described above, and therefore the frame 34B is in the preferred form of tubular concentric screens defining an annulus in which the fiber bundle skirt 32B may be contained. The fiber skirt is therefore effectively laminated between the two screen frame 34B to define the tubular shroud.

The external screen frame 34B is preferably formed of fine strands of woven metal for containing the fiber skirt therein yet provides suitable flexibility in the shroud. The screen extends around the distal end of the shroud to define the cuff 38 which is suitably flexible for conforming with the workpiece surface including any irregularities found thereon, as well as the weld beads as they are formed.

The proximal end of the screen frame 34B is initially open for receiving the fiber bundle during assembly, and defines the socket 36 which may be suitably clamped around the welding nozzle in the same manner as the sponge shroud illustrated in FIG. 2.

The mesh or pore size of the screen frame 34B may be suitably selected for being water permeable for wetting the fiber bundle during underwater use. In this way, the fiber bundle is constantly exposed to the external water during welding operation and is self-protected by the water against the high heat of welding. The wire feed port 48 may be formed through the screen frame by bonding a tubular sleeve therethrough, and the vent 46 may also be used if desired.

Figure 7:
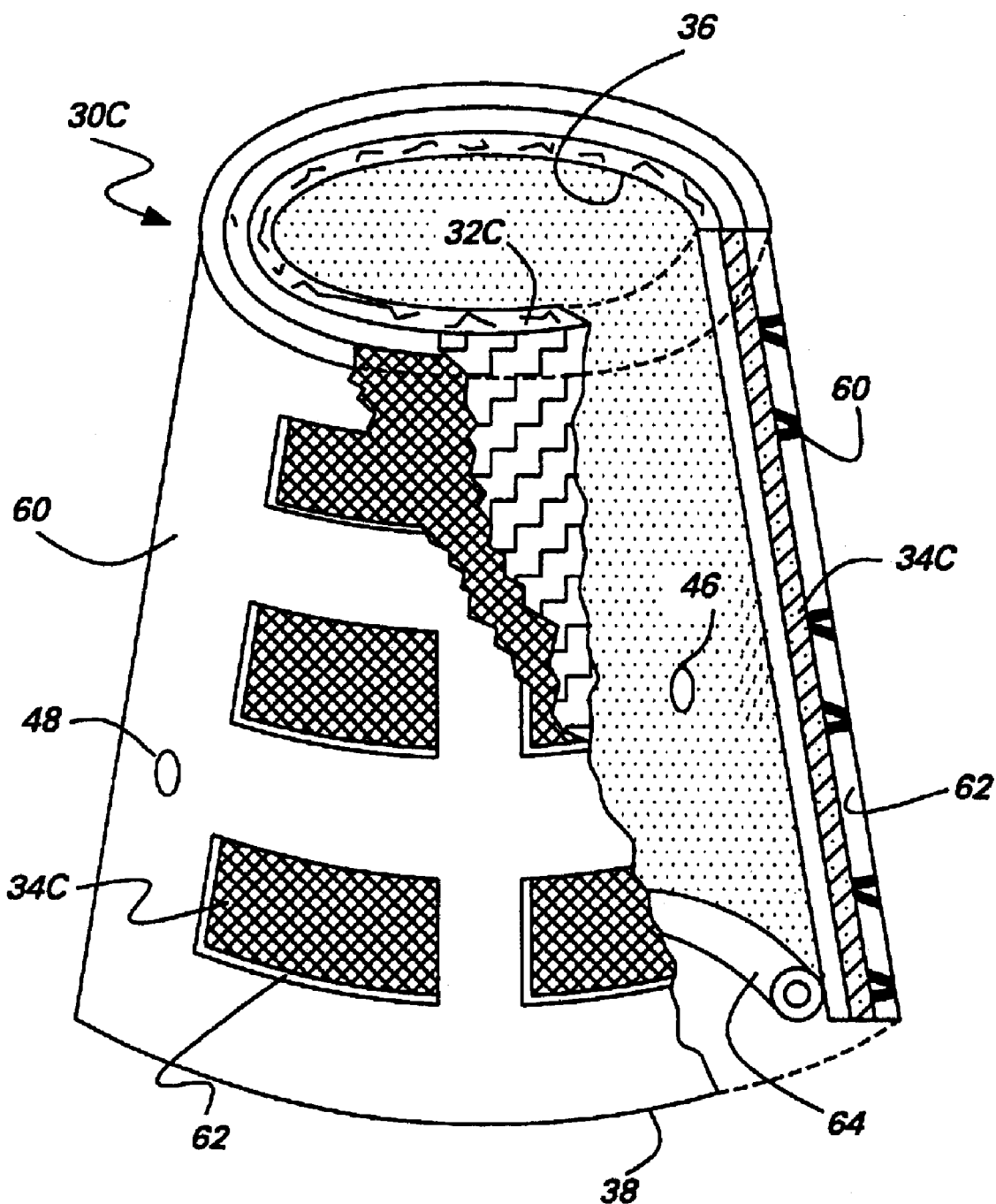
FIG. 7 is a partly sectional isometric view of a welding torch shroud in accordance with another embodiment of the present invention.

FIG. 7 illustrates yet another embodiment of the shroud, designated 30C, in which the skirt 32C is in the form of a chamois sheet of leather, or synthetic or natural cloth. A chamois sheet is well known for its affinity for water but is quite flimsy wet or dry.

Accordingly, a suitable frame 34C is provided for supporting the chamois in the desired configuration for excluding the water from the welding site. The frame 34C is preferably a tubular or conical screen of suitably fine strand metal such as stainless steel, which is internally lined with the chamois skirt 32C suitably bonded thereto, by silicone, for example, at distributed spots along the surface thereof. The screen frame is porous for permitting absorption of external water through the screen by the chamois during underwater operation.

To provide additional support, the screen frame 32C preferably has an external elastomeric skin 60, of silicone for example, which externally lines the screen and is bonded thereto. The silicone skin 60 has a plurality of holes or windows 62 which permit water access to the screen for absorption by the chamois skirt inside the shroud.

The frame illustrated in FIG. 7 may have any suitable configuration for supporting the internal chamois skirt 32C either in tubular form like the previous embodiment, or in the exemplary conical form illustrated. In the conical shroud, the frame increases in diameter from the socket 36 defined at the top end thereof to the cuff 38 defined at the bottom or distal end thereof.

The cone shape is inherently more rigid than a simple tube and adds structural strength to the otherwise flimsy chamois skirt 32C, flexible screen frame 34C, and flexible skin 60. The cuff 38 is nevertheless sufficiently flexible for conforming to the surface of the workpiece, and is preferably radially stiffened by introducing a metal mesh ring 64 concentrically joined inside or outside the cuff for preventing collapse thereof during underwater use.

The wire feed port 48 and the vent 46 may be suitably formed in this form of the shroud as desired.

The conical shroud illustrated in FIG. 7 may be readily manufactured on the outside of a conical form in the exemplary form of a funnel. The chamois sheet is suitably attached to the screen using stainless steel wire for example. The chamois and screen are then placed on the outside of the form. Uncured silicone is then applied in a suitable pattern over the screen. When the silicone cures the shroud is removed from the form and finish formed with the ring 64, vent 46, and wire feed port 48 as desired.

In all of the embodiments disclosed above, a hydrophilic material is used to define the various skirts which surround the nozzle of the welding torch to define the exclusion zone for underwater welding. The high water absorbing capability of the skirts protects them from damage from the high welding heat during operation, as well as permits their ability to conform at the respective cuffs to irregularities in the workpiece.

The various internal or external frames disclosed above maintain structural integrity of the flimsy skirts when wet to prevent undesirable collapse of the shroud during the welding process. The frames maintain the annular configuration of the shrouds, yet the cuff ends thereof remain flexible for conforming to the workpiece. The water filled skirts are effectively impervious to the pressurized gas developed inside the shrouds underwater and permit an effective contact seal between the cuff and workpiece.

A highly conforming welding torch shroud is therefore created, yet is self-protected by the absorbed water during underwater welding.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which we claim:

1. A welding torch shroud comprising a hydrophilic skirt formed of a water permeable sponge material and further comprising a frame configured to support said skirt when wet to maintain said annular form, the frame comprising a plurality of circumferentially spaced apart rods extending axially inside said skirt and between inner and outer surfaces of said skirt, from said socket toward said cuff;

wherein said skirt is annular, with a socket at one end for receiving said torch, and a flexible cuff at an opposite end for conforming to a workpiece being welded, and including an inwardly facing inner surface and an opposite outwardly facing outer surface exposed to a surrounding environment for absorbing water during use.

2. A shroud according to claim 1 wherein said socket is sized to fit said welding torch, and said skirt further includes a vent extending therethrough.

3. A shroud according to claim 2 wherein said skirt further includes a feed port extending therethrough for receiving a welding filler wire.

4. A shroud according to claim 1 wherein said sponge material skirt is rigid when dry and soft when wet.

5. A shroud according to claim 1 wherein said rods terminate inside said skirt short of said cuff for maintaining conformance thereof with said workpiece.

6. A shroud according to claim 5 wherein said rods are formed of silicone.

7. A shroud according to claim 1 wherein said cuff is annular, with a flat distal face for sealingly engaging said workpiece.

8. A shroud according to claim 7 wherein said cuff includes a pair of diametrically opposite steps.

9. A shroud according to claim 7 wherein said cuff includes a concentric slot in said flat distal face.

10. A shroud according to claim 1 wherein said skirt comprises a fiber bundle.

11. A shroud according to claim 10 wherein said frame comprises concentric screens containing said fiber bundle therebetween to define said socket and cuff at opposite axial ends thereof.

12. A shroud according to claim 11 wherein said screen frame is flexible for conforming said cuff to said workpiece.

13. A shroud according to claim 12 wherein said screen frame is water permeable for wetting said fiber bundle during use.

14. A shroud according to claim 1 wherein said skirt comprises a chamois sheet.

15. A shroud according to claim 14 wherein said frame comprises a tubular screen internally lined with said skirt.

16. A shroud according to claim 15 wherein said frame further comprises a silicone skin externally lining said screen, and having a plurality of windows therethrough for permitting water access through said screen to wet said skirt.

17. A shroud according to claim 16 wherein said frame further comprises a mesh ring concentrically joined to said cuff for preventing collapse thereof.

18. A shroud according to claim 17 wherein said frame is conical and increases in diameter from said socket to said cuff.

19. A shroud according to claim 1 in combination with a welding torch mounted in said socket, and further comprising means for channeling a gas into said shroud under pressure for excluding water entry therein during use.

20. A welding torch comprising a nozzle having a shroud mounted thereto, with said shroud including a hydrophilic sponge skirt supported by a frame; wherein said skirt is annular, with a socket at one end receiving said torch, and a flexible cuff at an opposite end for conforming to a workpiece being welded, and said frame further comprising a plurality of circumferentially spaced apart silicone rods extending axially through said sponge skirt from said socket toward said cuff and terminating short thereof.

21. A torch according to claim 20 wherein said skirt comprises a fiber bundle laminated between concentric screens defining said frame.

22. A torch according to claim 20 wherein said skirt comprises a chamois sheet internally lining an annular screen defining said frame, and externally lined with a silicone skin having windows therethrough.

23. A welding torch shroud comprising a hydrophilic skirt formed of a water permeable material further comprising a frame configured to support said skirt when wet to maintain said annular form;

wherein said skirt comprises a fiber bundle and is annular, with a socket at one end for receiving said torch, and a flexible cuff at an opposite end for conforming to a workpiece being welded and includes an inwardly facing inner surface, and an opposite outwardly facing outer surface exposed to a surrounding environment for absorbing water during use and wherein said frame comprises concentric screens containing said fiber bundle therebetween to define said socket and cuff at opposite axial ends thereof.

24. A shroud according to claim 23 wherein said screen frame is flexible for conforming said cuff to said workpiece.

25. A shroud according to claim 24 wherein said screen frame is water permeable for wetting said fiber bundle during use.

26. A welding torch shroud comprising a hydrophilic chamois sheet skirt formed of a water permeable material and further comprising a frame configured to support said skirt when wet to maintain said annular form;

wherein said skirt is annular, with a socket at one end for receiving said torch, and a flexible cuff at an opposite end for conforming to a workpiece being welded and said skirt includes an inwardly facing inner surface, and an opposite outwardly facing outer surface exposed to a surrounding environment for absorbing water during use; and wherein said frame comprises a tubular screen internally lined with said skirt.

27. A shroud according to claim 26 wherein said frame further comprises a silicone skin externally lining said screen, and having a plurality of windows therethrough for permitting water access through said screen to wet said skirt.

28. A shroud according to claim 27 wherein said frame further comprises a mesh ring concentrically joined to said cuff for preventing collapse thereof.

29. A shroud according to claim 28 wherein said frame is conical and increases in diameter from said socket to said cuff.

\* \* \* \* \*